United States Patent
Hsueh et al.

(10) Patent No.: US 9,340,644 B2
(45) Date of Patent: May 17, 2016

(54) SELF-SENSITIVE POLYMERIZABLE LIQUID RESIN AND USE THEREOF

(71) Applicant: ETERNAL CHEMICAL CO., LTD., Kaohsiung (TW)

(72) Inventors: Sheng-Yao Hsueh, Kaohsiung (TW); Hung-Yu Wang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 13/886,574

(22) Filed: May 3, 2013

(65) Prior Publication Data

US 2013/0296485 A1  Nov. 7, 2013

(30) Foreign Application Priority Data

May 4, 2012 (TW) .............................. 101116149 A

(51) Int. Cl.
| | |
|---|---|
| *C08G 63/66* | (2006.01) |
| *C09D 167/07* | (2006.01) |
| *C08G 63/00* | (2006.01) |
| *C08G 63/40* | (2006.01) |
| *C09D 167/06* | (2006.01) |
| *C08G 61/12* | (2006.01) |
| *C09D 4/06* | (2006.01) |

(52) U.S. Cl.
CPC ................ *C08G 63/66* (2013.01); *C08G 61/12* (2013.01); *C08G 63/005* (2013.01); *C08G 63/40* (2013.01); *C09D 167/06* (2013.01); *C09D 167/07* (2013.01); *C08G 2261/135* (2013.01); *C08G 2261/334* (2013.01); *C08G 2261/354* (2013.01); *C08G 2261/76* (2013.01); *C09D 4/06* (2013.01)

(58) Field of Classification Search
CPC ...... C09D 167/07; C09D 4/06; C08G 63/005; C08G 63/66
USPC ................................... 524/592; 528/220, 306
See application file for complete search history.

(56) References Cited

U.S. PATENT DOCUMENTS

| | | | | |
|---|---|---|---|---|
| 7,232,540 | B2 * | 6/2007 | Gould et al. .................. | 264/494 |
| 8,674,089 | B2 * | 3/2014 | Fabian et al. ................. | 540/575 |
| 2005/0107509 | A1 | 5/2005 | Ananthachar et al. | |
| 2005/0245631 | A1 | 11/2005 | Gould et al. | |

FOREIGN PATENT DOCUMENTS

| | | | |
|---|---|---|---|
| CN | 1919893 | A | 2/2007 |
| CN | 1957000 | A | 5/2007 |
| CN | 101255229 | A | 9/2008 |
| JP | 07048472 | A * | 2/1995 |
| TW | 200610772 | A | 4/2006 |
| WO | WO 2011001928 | A1 * | 1/2011 |

OTHER PUBLICATIONS

Non-English Action with Search Report dated Aug. 26, 2014 for Application No. TW 102115943 and an English translation of the Search Report.
Espacenet English abstract of CN 101255229 A.
Espacenet English abstract of CN 1919893 A.

\* cited by examiner

*Primary Examiner* — Vickey Nerangis

(74) *Attorney, Agent, or Firm* — Ladas & Parry LLP

(57) ABSTRACT

A self-sensitive polymerizable liquid resin is provided, which contains an uncrosslinked Michael addition reaction product of the following components: a Michael donor, a Michael accepter and optionally a viscosity modifier. The Michael accepter has 5 to 18 acryloyl functional groups. The self-sensitive polymerizable liquid resin of the present invention is capable of being used as an aid in a coating composition and providing a good property in deep radiation curing, and is particularly applicable in color coatings.

17 Claims, 1 Drawing Sheet

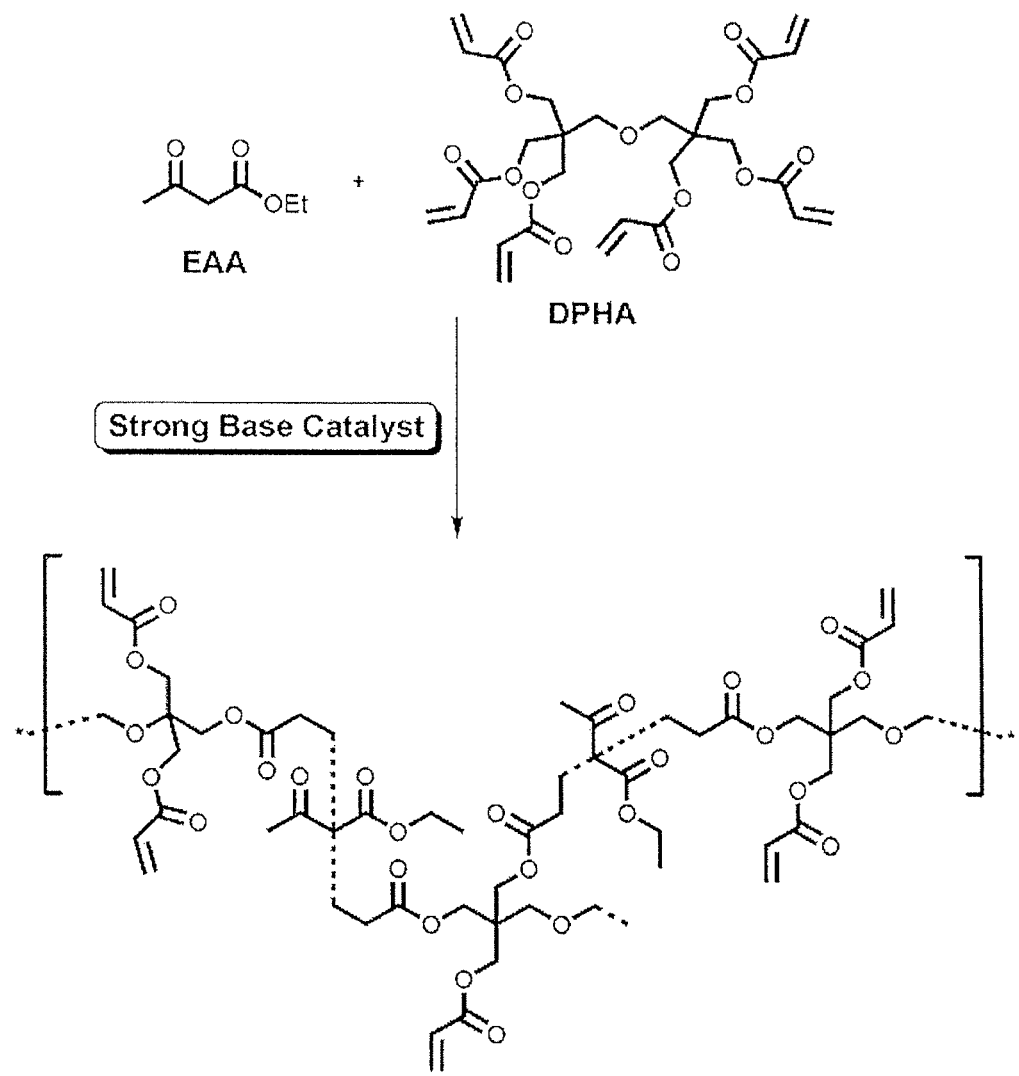
PRIOR ART

SELF-SENSITIVE POLYMERIZABLE LIQUID RESIN AND USE THEREOF

BACKGROUND OF THE INVENTION

1. Field of the Invention

The present invention relates to a self-sensitive polymerizable liquid resin, which provides excellent properties in deep curing and dark-color curing. The present invention also relates to a coating composition containing the resin, which can be coated on a surface of a substrate to form a film.

2. Description of the Related Art

Environmental concerns have prompted widespread adoption of radiation curing processes such as UV curing in the preparation of coatings. Due to improvements in raw materials, a UV-cured coating can be prepared at commercial production speed by addition of a photo initiator, so as to produce printed matter or film with good haze, durability and chemical resistance. However, the conventional photo initiator (such as benzophenone) has disadvantages in terms of toxicity, cost, and odor. The conventional photo initiator also has the disadvantage of easily resulting in Newton's rings, which limits the practical value of the photo initiator on transparent, white and light-colored coatings.

To form a thick coating on plastic or glass, a dual-curing process combining thermo curing and photo curing can be adopted, in which a mixture of different photo and thermo initiators are used to ensure the curing of the surface and the interior of the coated thick film (such as a film produced by screen printing), so as to form a functional film. However, such film is expensive to produce, involves numerous restrictions on selection of reagents and increases the complexity of manufacturing, so the process is economically disadvantageous.

Presently, efforts are underway to reduce the amount of the photo initiator in a photo curing coating formulation by blending a self-sensitive polymerizable resin and a color material with the coating composition. The optical activity inherent to such radiation curable resin allows a good UV curing effect to be achieved without using a photo initiator.

The self-sensitive polymerizable resin can be a multifunctional acrylate resin formed by reacting an acrylate monomer and oligomer with a compound that can participate in a Michael addition reaction, for example, β-keto ester (such as acetoacetic ester), β-diketone (such as pentane-2,4-dione), β-keto amide (such as acetoacetanilide and acetoacetamide) and/or other β-dicarbonyl compounds.

Compared with a common formulation containing a photo initiator, the formulation containing the self-sensitive polymerizable resin has better odor characteristics, because no photo initiator remains after curing. Common photo-polymerization monomers are crosslinked after ultraviolet irradiation in the presence of a photo initiator, or cured due to triggering of free radicals that are activated by a peroxide. The photo initiator and/or peroxide is a typical low-molecule multifunctional compound, can volatilize and generates an undesired odor after environmental quenching, and can be easily absorbed by skin, thus having adverse impact on health. Use of a functional oligomeric photo initiator can overcome some of the disadvantages, because a polymerized photo initiator is generally a non-volatile compound, and is not easily absorbed by skin. However, preparation of the functional oligomeric photo initiator includes multiple synthesis steps, and the functionality is unfavorable to the reaction and the final desired property. When a self-sensitive polymerizable resin is used, no odor is generated or volatilized even if some resin remains, since the resin is a non-volatile polymer.

However, there are many restrictions on synthesis of a conventional self-sensitive polymerizable resin. For example, Mozner and Rheinberger (Macromolecular Rapid Communications, volume 16 p 135-138, 1995) report that an acetoacetic ester donor compound can be added to a multifunctional acrylate acceptor compound to undergo a Michael addition reaction. However, if the acetoacetic ester is added into an acrylate compound having three or more functional groups through an addition reaction, the crosslinked polymerization product is crosslinked gel. Although the product still has unreacted acryloyl functional groups, the generated network structure can be regarded as a gelatinized or cured structure. Since the network structure has been substantially crosslinked, it cannot be turned into a liquid state by heating or dissolving it with a solvent. Therefore, there is an urgent need in the industry to resolve the issue of how to use a multifunctional Michael acceptor without gelation.

SUMMARY OF THE INVENTION

Accordingly, the present invention is directed to a self-sensitive polymerizable liquid resin for solving the above problems. Specifically, the liquid resin of the present invention can effectively overcome the phenomenon of gelation occurring when multi-functional acrylate resin is used in the prior art. In addition, the liquid resin of the present invention can be effectively crosslinked due to multiple functional groups with reduced use of a photo initiator, and even without use of a photo initiator, thereby allowing it to have a desired odor and providing effects of deep curing and dark-color radiation curing. Moreover, the resin of the present invention can be used as an aid to form a coating composition with a color coating that can be coated on a substrate by a common coating method. The fabrication process is simple, easy and inexpensive compared with conventional techniques.

The objective of the present invention is to provide a self-sensitive polymerizable liquid resin, containing an uncrosslinked Michael addition reaction product of the following components:
(a) a Michael donor;
(b) a Michael acceptor; and
(c) optionally a viscosity modifier;
wherein the Michael acceptor (b) has 5 to 18 acryloyl functional groups; and the molar ratio of (a) to (b) is in a range of 1:2 to 1:100.

Another objective of the present invention is to provide a coating composition containing the self-sensitive polymerizable liquid resin described above, wherein the coating composition may further contain a color coating. The composition has a desired odor and provides properties of deep curing and dark-color curing.

Still another objective of the present invention is to provide a film, including a substrate and a coating on a surface of the substrate, in which the coating is formed by the coating composition through curing.

BRIEF DESCRIPTION OF THE DRAWINGS

The invention will be described according to the appended drawings in which:

the FIGURE shows a chemical reaction of a Michael donor and a Michael acceptor to form an uncrosslinked self-sensitive polymerizable resin.

PREFERRED EMBODIMENT OF THE PRESENT INVENTION

A self-sensitive polymerizable liquid resin of the present invention includes an uncrosslinked Michael addition reaction product, where the uncrosslinked Michael addition reaction product has the following components as reaction units:
 (a) a Michael donor;
 (b) a Michael acceptor; and
 (c) optionally a viscosity modifier;
wherein the component Michael acceptor (b) has 5 to 18 acryloyl functional groups; and the molar ratio of (a) to (b) is in a range of 1:2 to 1:100.

The self-sensitive polymerizable liquid resin has a viscosity of 50 to 30000 cps at 60° C., and preferably 50 to 15000 cps.

According to the present invention, the content of the Michael donor is approximately 1 wt % to 40 wt %, and preferably 1 wt % to 20%, based on the total weight of the self-sensitive polymerizable liquid resin.

According to the present invention, the content of the Michael acceptor is approximately 50 wt % to 99 wt %, and preferably 60 wt % to 96%, based on the total weight of the self-sensitive polymerizable liquid resin.

In order to effectively avoid excessive crosslinking of resin molecules, the reaction components of the uncrosslinked Michael addition reaction product optionally contain a viscosity modifier, and the content of the viscosity modifier is approximately 0 wt % to 40 wt %, and preferably 1 wt % to 30%, based on the total weight of the self-sensitive polymerizable liquid resin.

When the content of the Michael donor in the resin exceeds 40 wt %, the excessive Michael donor may cause gelation of the whole resin, and the liquid resin of the present invention cannot be obtained.

In the self-sensitive polymerizable liquid resin of the present invention, the molecular weight of the Michael donor is generally in a range of 100 to 2000. If the molecular weight is less than 100, a suitable Michael donor is not easy to be selected, so it is not practicable; but if the molecular weight is greater than 2000, the prepared self-sensitive polymerizable liquid resin has poor reactivity after further radiation curing, so such Michael donor is unfavorable to subsequent application.

The Michael donor suitable for the present invention is not particularly limited, and may be any Michael donor that is well known to persons of ordinary skill in the art, including, but not limited to, one selected from the group consisting of: β-keto esters, β-diketones, β-keto amides, β-keto polyesters, β-keto epoxies, β-keto polyepoxies and other β-dicarbonyl compounds.

According to an embodiment of the present invention, the Michael donor useful in the present invention may be represented by the following general formula:

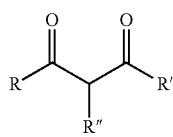

wherein R, R' and R" have the following definitions:
 is (i) when R"═H, and R and R' are independent groups, R and R' may be the same or different, and are individually selected from the group consisting of: methyl, ethyl, isobutyl, benzyl, methoxy, ethoxy, tert-butoxy, isopropyl, 2-methoxyethoxy, 2-ethylhexyloxy, dodecyloxy, cetyloxy, octadecyloxy, cyclohexyloxy and allyl; aryl, such as phenyl, tolyl, xylyl, naphthyl, phenanthryl, anthryl and fluoryl; amino, such as methylamino, dimethylamino, ethylamino, diethylamino, ethylhexylamino, tert-butylamino, anilino, diphenylamino and $C_1$-$C_{18}$alkylanilino; a polyether group, such as 2-(2-methoxyethoxy)ethoxy, 2-(2-ethoxyethoxy)ethoxy, 2-(2-butoxyethoxy)ethoxy, 2-(2-(2-hydroxyethoxy)ethoxy)ethoxy, 2-ethoxyethoxy, 2-hydroxyethoxy and 2-hydroxypropoxy; and a urethane group, such as 2-(tert-butoxycarbonylamino)ethoxy.

(ii) when R"═H, and R and R' form a cyclic structure together, the cyclic structure is selected from the group consisting of:

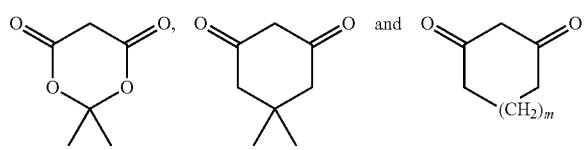

where m is an integer of 0 to 3.

(iii) when R"≠H, and R and R' are independent groups, R" is selected from the group consisting of: methyl, ethyl, isobutyl, benzyl, methoxy, ethoxy, tert-butoxy, isopropyl, 2-methoxyethoxy and 2-ethylhexyloxy; and aryl, such as phenyl, tolyl, xylyl, naphthyl, phenanthryl, anthryl and fluoryl;
 and R and R' may be the same or different, and are individually selected from the group consisting of: methyl, ethyl, isobutyl, benzyl, methoxy, ethoxy, tert-butoxy, isopropyl, 2-methoxyethoxy, 2-ethylhexyloxy, dodecyloxy, cetyloxy, octadecyloxy, cyclohexyloxy and allyl; aryl, such as phenyl, tolyl, xylyl, naphthyl, phenanthryl, anthryl and fluoryl; amino, such as methylamino, dimethylamino, ethylamino, diethylamino, ethylhexylamino, tert-butylamino, anilino, diphenylamino and $C_1$-$C_{18}$alkylanilino; a polyether group, such as 2-(2-methoxyethoxy)ethoxy, 2-(2-ethoxyethoxy)ethoxy, 2-(2-butoxyethoxy)ethoxy, 2-(2-(2-hydroxyethoxy)ethoxy)ethoxy, 2-ethoxyethoxy, 2-hydroxyethoxy and 2-hydroxypropoxy; and a urethane group, such as 2-(tert-butoxycarbonylamino)ethoxy.

(iv) when R"≠H, and R and R" form a cyclic structure together, the cyclic structure is selected from:

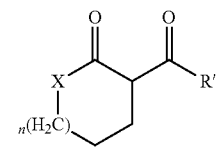

where n is an integer of 0 to 3, X is selected from $CH_2$, NH, O or S, and R' is selected from the group consisting of: methyl, ethyl, isobutyl, benzyl, methoxy, ethoxy, tert-butoxy, isopropyl, 2-methoxyethoxy, 2-ethylhexyloxy, dodecyloxy, cetyloxy, octadecyloxy, cyclohexyloxy and allyl; aryl, such as phenyl, tolyl, xylyl, naphthyl, phenanthryl, anthryl and fluoryl; amino, such as methylamino, dimethylamino, ethylamino, diethylamino, ethylhexylamino, tert-butylamino, anilino, diphenylamino and $C_1$-$C_{18}$alkylanilino; a polyether group, such as 2-(2-methoxyethoxy)ethoxy, 2-(2-ethoxyethoxy)ethoxy, 2-(2-butoxyethoxy)ethoxy, 2-(2-hydroxyethoxy)ethoxy)ethoxy, 2-ethoxyethoxy, 2-hydroxyethoxy and 2-hydroxypropoxy; and a urethane group, such as 2-(tert-butoxycarbonylamino)ethoxy.

According to a preferred embodiment of the present invention, examples of the Michael donor useful in the present invention may be selected from the group consisting of: ethyl acetoacetate, methyl acetoacetate, 2-ethylhexylacetoacetate, laurylacetoacetate, tert-butyl acetoacetate, allylacetoacetate, benzylacetoacetate, isobutylacetoacetate, 2-methoxyethyl acetoacetate, 1,4-butanediol diacetoacetate, 1,6-hexane diol diacetoacetate, neopentyl glycol diacetoacetate, cyclohexanedimethanol diacetoacetate, ethoxylated bisphenol A diacetoacetate, trimethylolpropane triacetoacetate, polycaprolactone triacetoacetate, pentaerythritol tetraacetoacetate, acetoacetanilide, N-alkyl acetoacetanilide, acetoacetamide, 2-acetoacetoxyethylacrylate, 2-acetoacetoxyethyl methacrylate, pentane-2,4-dione, hexane-2,4-dione, heptane-3,5-dione, dibenzoylmethane, diethyl methylmalonate, diethyl isopropylmalonate, cycloisopropyl(isopropylidenyl)malonate, 5,5-dimethylcyclohexane-1,3-dione, cyclopentane-1,3-dione, cyclohexane-1,3-dione, cycloheptane-1,3-dione, cyclooctane-1,3-dione, 2-acetylcyclopentatone, 2-acetylcyclohexanone, 2-acetylcycloheptanone, 2-acetylcyclooctanone and a mixture thereof, with ethyl acetoacetate, methyl acetoacetate, 2-ethylhexyl acetoacetate, acetoacetamide, pentane-2,4-dione, dibenzoylmethane, diethyl methylmalonate, cycloisopropyl(isopropylidenyl)malonate, cyclohexane-1,3-dione, 2-acetylcyclopentatone and a mixture thereof being preferred.

The Michael acceptor used in the present invention has 5 to 18 acryloyl functional groups, and preferably 5 to 15 acryloyl functional groups. According to a specific embodiment of the present invention, the Michael acceptor is a multifunctional acrylic or acrylate compound, and the compound generally is a monomer, an oligomer, a polymer or a combination thereof, and has a molecular weight in a range of 500 to 100,000, and preferably a molecular weight in a range of 500 to 50,000, and most preferably a molecular weight in a range of 500 to 5,000. The acrylate compound useful in the present invention includes, for example, but not limited to: alcohol acrylate, such as dipentaerythritol pentacrylate, dipentaerythritol hexaacrylate, sorbitol hexaacrylate or caprolactone modified dipentaerythritol hexaacrylate; polyurethane acrylate, such as aliphatic polyurethane hexaacrylate, aromatic polyurethane hexaacrylate, aliphatic polyurethane octaacrylate, aromatic polyurethane octaacrylate, aliphatic polyurethane nonaacrylate, aromatic polyurethane nonaacrylate, aliphatic polyurethane pentadecacrylate and aromatic polyurethane pentadecacrylate; polyepoxyacrylate, such as poly(bisphenol-A epoxy hexaacrylate) or poly(novolac epoxy hexaacrylate); polyester acrylate, such as polyester hexaacrylate, fatty acid modified polyester hexaacrylate or polyester polyol based acrylate; and melamine hexaacrylate; or a mixture thereof, with alcohol acrylate, polyurethane acrylate, melamine hexaacrylate or a mixture thereof being preferred.

The commercially available acrylate compound suitable for the present invention includes: Trade Name SR454®, SR494®, SR9020®, SR9021® or SR9041® manufactured by Sartomer Inc.; Trade Name 6101-100®, 6148-5®, 6149-J75®, 6195-100°, 6196-100®, 6197®, 6361-100®, 6363®, 6362-100®, 624-100®, 6184T-85®, 6161-100®, EM263®, EM264®, EM2696®, EM2692®, EM265®, EM266®, EM267®, DR-E522®, DR-U024®, DR-U011®, DR-U018®, DR-U076®, DR-U095®, DR-U106®, DR-U110®, DR-U116® or DR-G908® manufactured by Eternal Chemical Co., Ltd.; and Trade Name Ebecryl 600®, Ebecryl 830®, Ebecryl 3605® or Ebecryl 6700® manufactured by UCB Company.

The self-sensitive polymerizable liquid resin of the present invention may be obtained through a polymerization method that is well known to persons of ordinary skill in the art, for example, the method shown in FIG. 1. In FIG. 1, as an example, the Michael donor is EAA (ethyl acetoacetate); and the Michael acceptor is DPHA (dipentaerythritol hexaacrylate).

According to a specific embodiment of the present invention, in order to avoid gelation caused by over-crosslinking during the Michael addition reaction, a viscosity modifier may be optionally added. The viscosity modifier may participate in the reaction to form a covalent bond (with a quaternary carbon) with the donor at the terminal of the resin, so that gelation caused by over-crosslinking of the resin molecules can be effectively avoided. The viscosity modifier usable in the present invention has a molecular weight of less than 1000, and preferably a molecular weight in a range of 180 to 900. The viscosity modifier useful in the present invention includes a monofunctional or bifunctional acrylic monomer, a monofunctional or bifunctional acrylate monomer or a mixture thereof, with the monofunctional or bifunctional acrylate monomer being preferred. The monofunctional or bifunctional acrylate monomer includes, for example, but not limited to:

methyl methacrylate, butyl acrylate, 2-phenoxy ethyl acrylate, ethoxylated 2-phenoxy ethyl acrylate, 2-(2-ethoxyethoxy)ethyl acrylate, β-carboxyethyl acrylate, lauryl(meth)acrylate, isooctyl acrylate, stearyl(meth)acrylate, isodecyl acrylate, isoborny(meth)acrylate, benzyl acrylate, 2-ethylhexyl acrylate, hydroxypivalyl hydroxypivalate diacrylate, polyethylene glycol(200)diacrylate, ethoxylated 1,6-hexanediol diacrylate, dipropylene glycol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, hydroxyethyl acrylate (HEA), 2-hydroxyethyl methacrylate (HEMA), 2-hydroxyethyl acrylate (HEA), tripropylene glycol di(meth)acrylate, 1,4-butanediol di(meth)acrylate, 1,6-hexanediol di(meth)acrylate, allylated cyclohexyl di(meth)acrylate, isocyanurate di(meth)acrylate or a mixture thereof. In the present invention, the term "(meth)acrylate" encompasses both methacrylates and acrylates.

The viscosity modifier suitable for the present invention is preferably methyl methacrylate, butyl acrylate, 2-phenoxy ethyl acrylate, hydroxypivalyl hydroxypivalate diacrylate, ethoxylated bisphenol-A di(meth)acrylate, hydroxyethyl acrylate, ethylene glycol dimethacrylate, isoborny(meth) acrylate or a mixture thereof.

Examples of commercially available acrylate monomer include: Trade Name EM2108®, EM2107®, EM2105®, EM210®, EM211®, EM212®, EM224®, EM2241®, EM225®, EM2251®, EM226®, EM2260®, EM2261®EM2263®, EM2265®, EM221®, EM228®, EM2280®, EM2288®, EM229®, EM2202®, EM2205®, EM221®, EM222®, EM223®, EM70®, EM231®, EM265®, EM320®, EM328® or EM39® manufactured by Eternal Chemical Co., Ltd.

The present invention also provides a coating composition, containing the self-sensitive polymerizable liquid resin described above. The use amount of the self-sensitive polymerizable liquid resin of the present invention in the coating composition is not particularly limited, and according to preferred implementation aspect of the present invention, the use amount is in a range of approximate 5% to 30%, based on the total weight of the coating composition.

The coating composition further contains the following components:

(I) a carrier resin;
(II) a dilution monomer; and
(III) optionally a coloring material.

A common colorless coating composition is referred to as varnish paint, and a coating composition with a coloring material added is referred to as a color coating. The carrier resin is not particularly limited, and may be a resin having good adhesion with a corresponding substrate. For example, when the substrate is glass, polysiloxane resin or modified polyacrylic resin may be selected; and when the substrate is plastics, such as acrylonitrile butadiene styrene (ABS), polycarbonate (PC), polypropylene (PP), polyethylene terephthalate (PET) or polymethyl methacrylate (PMMA), polyacrylic resin, modified polyacrylic resin, polyurethane or polyester resin may be selected. The dilution monomer includes, for example, but not limited to, a vinyl group-containing monomer having a molecular weight of less than 700, for example, acrylate monomer. The coloring material is not particularly limited, and may be a transparent material, a semitransparent material or an opaque material, and may be a pigment, dye or filler that can provide a substantial color for the composition of the present invention and a coating formed by the composition or can modify defects on the surface of the substrate. The amount of the components (I+II+III) is in a range of 50 wt % to 95 wt %, and preferably in a range of 60 wt % to 90 wt %, based on the total weight of the coating composition.

In order to reduce energy required for curing, or to enable the surface and the interior of the color coating to be cured, the coating composition of the present invention may optionally further contain a photo initiator. The photo initiator suitable for the present invention is not particularly limited, and includes, for example, but not limited to, benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, or a mixture thereof, with benzophenone, 1-hydroxy cyclohexyl phenyl ketone or 2,4,6-trimethylbenzoyl diphenyl phosphine oxide being preferred. Generally, if existing, the amount of the photo initiator is approximately 0.1% to 5%, and preferably 0.1% to 3%, based on the total weight of the coating composition.

The coating composition of the present invention may also optionally contain an additive that is well known to persons of ordinary skill in the art, including, for example, but not limited to, a synergist, a sensitizer, a dispersing agent, a wetting agent, a thickening agent, a defoamer or a thixotropic agent.

Presently, in the commercially available transparent varnish paint, the problem that the thickness of a single coated coating film is excessively thin (10 μm) is generally exists, for example, if a thick coating (for example, 100 μm) is required, multiple application needs to be performed, resulting in excessively high production costs. If the transparent varnish paint is coated with a large thickness, the problem that the deep level cannot be cured and the surface of the coating is dry but the interior is not dry easily occurs, so that the durability of the coating is reduced after a long time due to incomplete curing, and the fabricated texture or color area is aged rapidly or deformed, thereby influencing the quality of the coating severely.

The coating composition of the present invention may be applied to a one-step process of a transparent varnish coating, a uniform thick coating of 100 μm or more can be formed through a single coating process, and after curing, an evenly dry coating can be formed. The process has the advantage of being simple and rapid. The thickness of the varnish coating formed by the coating composition of the present invention is generally in a range of 1 μm to 500 μm, and preferably in a range of 1 μm to 300 μm.

For color coating, presently, one of the problems in the color coating to be overcome is how to effectively cure a coating in a deep color coating. Since a deep color coating cannot effectively absorb energy of a radiation (curing) source, the curing rate and the degree of completion of curing is slower or lower than those of a transparent or light color system. Even at least two photo initiators that can absorb different light wave bands are added, the coating till cannot be completely cured, so that a coating composition having a high curing rate (can be evenly cured at the surface and the interior) needs to be used at a low-radiation curing condition, so as to solve the problem.

According to a preferred implementation aspect of the present invention, the color coating prepared by the coating composition of the present invention can be effectively cured in a deep color coating, because it contains the self-sensitive polymerizable liquid resin of the present invention as an aid for curing. The self-sensitive polymerizable liquid resin of the present invention can be used alone, or optionally be used in combination with other photo initiators.

In addition, most of the photo initiator materials contained in the coating composition used in the present market absorb the ultraviolet in the ultraviolet light, and the absorbed ultraviolet energy activates the photo initiator to generate a free radical having crosslinking reactivity, so as to initiate a series of crosslinking reaction. However, the photo initiator has toxicity, which is unfavorable to the fabrication and application. Thus, when the self-sensitive polymerizable resin is used in fabricating the coating, the disadvantage can be effectively eliminated. The coating composition of the present invention may be added no photo initiator, so that no photo initiator remains after light curing, and the problems of release of noxious substance or occurrence of toxicity and generation of odor and deterioration of anti-aging performance of the coating do not occur; therefore, the coating composition of the present invention can be used in package of foods, medicines and hygiene articles.

In addition, because the coating composition containing the self-sensitive polymerizable liquid resin of the present invention has no solvent contained, the step of drying in the conventional coating fabrication can be effectively omitted. The coating composition can be cured by energy of a radiation source (for example, UV light), and problems of contamination of volatilized solvent and erosion of the fabrication machine do not exist, and the coating composition has more excellent stability in storage, compared with a solvent-containing coating. Additionally, the coating composition of the present invention can further overcome the disadvantage of conventional UV-type coating of incomplete deep curing, and can be effectively used in fabrication of a thick coating, so that the coating composition has the characteristic of environmental protection, which is favorable to application of materials for green energy.

According to a preferred specific embodiment of the present invention, a fabrication method of the coating composition of the present invention includes the following steps:

(a) mixing a Michael donor, a Michael acceptor and a suitable amount of a base to carry out a Michael addition reaction;

(b) optionally adding a viscosity modifier to the reaction and stirring for 10 to 50 minutes;

(c) raising the temperature in the reactor to 80° C. to 100° C., and reacting for 5 to 12 hours at a fixed temperature, to obtain an uncrosslinked self-sensitive polymerizable resin;

(d) fully mixing the self-sensitive polymerizable resin of Step (c) with a carrier resin and a dilution monomer, and optionally a photo initiator, and stirring for 0.5 to 5 hours at room temperature, to obtain the coating composition of the present invention; and (e) optionally adding a coloring material to the coating composition of Step (d), and fully mixing, to obtain the color coating composition of the present invention.

The base of a suitable amount in Step (a) is not particularly limited, and may be an organic base or an inorganic base, preferably an organic base, and more preferably amine, for example, 1,8-diazabicyclo[5.4.0]undec-7-ene (DBU) or 1,5-diazabicyclo[4.3.0]non-5-ene (DBN).

The viscosity modifier in Step (b) may be selected as described above.

The carrier resin, the dilution monomer and the photo initiator in Step (d) may be selected as described above.

The coloring material in Step (e) may be selected as described above.

The present invention provides a film, including a substrate. At least one surface of the substrate has at least one layer of coating formed by the coating composition described above, in which the coating is formed by the coating composition of the present invention through drying and curing, and the adhesion strength of the coating is measured to be B or more, and preferably 3 B or more, according to the standard method of ASTM D3359-02. For example, the coating composition of the present invention may be clad on at least one surface of the substrate to form at least one coating, which is then heated and dried to form a film. The cladding method may be any application method that is well known to persons of ordinary skill in the art, for example, coating, spray, screen printing, printing or dipping.

The coating method includes, for example, but not limited to, knife coating, roller coating, flexographic coating, thermal transfer coat, micro gravure coating, flow coating, curtain coating, spin coating, spray coating, bar coating, slot die coating, gravure coating, slide coating, or other well-known methods, or a combination thereof.

The printing method includes, for example, but not limited to, gravure printing, micro gravure printing, letterpress printing, ink-jet printing, or a combination thereof.

The substrate of the film of the present invention is not particularly limited, and is well known to persons skilled in the art, and the selection of the substrate depends on the design of electronic products to be applied. The substrate includes, for example, but not limited to, glass, metal, plastic, carbon fiber, glass fiber, or a composite material thereof.

The plastic substrate suitable for the present invention includes, but not limited to, ABS, polyester resin such as PET or polyethylene naphthalate (PEN); polyacrylate resin such as PMMA; polyolefin resin such as polyethylene (PE) or polypropylene (PP); polycycloolefin resin; polyamide resin such as nylon 6, nylon 66 or MXD nylon (m-xylenediamine/adipic acid copolymer); polyimide resin; polycarbonate resin; polyurethane resin; polyvinyl chloride (PVC); triacetyl cellulose (TAC); polylactic acid; an olefinic polymer with a substituent, such as polyvinyl acetate or polyvinyl alcohol, with polyester resin, polyacrylate resin, polyimide resin, polycarbonate resin or a combination thereof being preferred, and polyethylene terephthalate, polymethyl methacrylate, polyimide resin or polycarbonate resin being more preferred. The thickness of the substrate is not particularly limited, and generally depends on the requirements for the product to be manufactured, and generally, is approximately 15 µm to 300 µm.

According to a specific embodiment of the present invention, the color film of the present invention may include an ABS plastic substrate and a color coating. The coating is formed by cladding the coating composition containing a coloring material described above on at least one surface of the ABS plastic substrate through coating, spray or dipping, in combination with radiation curing. The thickness of the coating is approximately 5 to 50 µm, and the color coating of the present invention has a good color rendering effect (having a gloss level of greater than 90 gloss units measured at 60°). Compared with commercially available coatings fabricated by conventional coating compositions, the coating of the present invention has the energy saving efficacy due to high photo-polymerization efficiency, so that the cost is significantly reduced; and moreover, due to convenient application, the coating can be widely applied in printed matters or color paints.

The present invention is further described below with reference to specific implementation aspects, but it should be noted that, the exemplary aspects are merely used to illustrate the present invention, but not intended to limit the scope of the present invention. Modifications and variations easily made by persons of ordinary skill in the art shall fall within the scope of the disclosure of the specification and the accompanying claims.

EXAMPLES

<Abbreviated Names>
EAA: ethyl acetoacetate(ethyl 3-oxobutanoate)
acac: acetoacetone(pentane-2,4-dione)
DBM: dibenzoylmethane(1,3-diphenylpropane-1,3-dione)
DDD: 2,2-dimethyl-1,3-dioxane-4,6-dione/meldrum's acid
DBU: 1,8-diazabicyclo[5.4.0]undec-7-ene
MEK: methyl ethyl ketone <Viscosity test>
According to the standard method of ASTM D4287-94, the viscosity of the composition is tested by using a Brookfield HB viscometer with a CP5 platter, at a rotation speed of 5 rpm at 60° C. The viscosity values in the examples of the present invention are tested at a temperature of 60° C., and the obtained viscosity values are listed in Table 1.

<Cross Hatch Adhesion Test>
According to the standard method of ASTM D-3359-02, after a coating having a thickness of 13 µm coated on an ABS plastic substrate is cured (800 mJ/cm), the adhesion degree is tested and is classified into 6 levels, 5 B to 0 B, and the obtained levels are listed in Tables 3 and 4.

<Solvent Resistance (MEK) Test>
According to the standard method of ASTM D-1308, after a coating having a thickness of 13 µm or 20.6 µm coated on an ABS substrate is cured (800 ml/cm), the coating is wrapped back and forth with a force of a load of 1000 g on a solvent resistance tester to test the solvent resistance (MEK) wrapping times of the coating surface, and the numerals are listed in Table 3.

<Gloss Level Test>

According to the standard method of ASTM D523-89, the gloss level of the coating surface at 60° is tested, and the numerals are listed in Table 3.

Preparation Example 1

373 g trifunctional acrylate monomer (EM235-1 provided by Eternal Chemical Co., Ltd.) and 0.57 g catalyst DBTL (dibutyltin dilaurate, ACROS CHEMICALS) were weighed and mixed in a four-mouth flask with stirring at room temperature in the presence of nitrogen, and 200 g trifunctional isocyanate (Desmodur XP2580 provided by Bayer AG) was then added slowly. The temperature was raised to 75° C. The reaction was carried out for 8 hours, to obtain 573 g nonafunctional acrylate monomer. The weight-average molecular weight (Mw) was tested to be 1,390 by gel permeation chromatography (GPC) (model: Waters 2414 RI).

Example A

Example A-1

2800 g hexafunctional acrylate monomer (EM265 provided by Eternal Chemical Co., Ltd.) and 9.25 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, and 158 g (0.25 equivalent weight) Michael donor (EAA, ACROS CHEMICALS) was then added. The temperature was raised to 95° C. The reaction was carried out for 6 hours, to obtain 2960 g final resin (HSY-703).

Example A-2

500 g hexafunctional acrylate monomer (EM265 provided by Eternal Chemical Co., Ltd.) and 2.63 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, and 45 g (0.4 equivalent weight) Michael donor (EAA, ACROS CHEMICALS) was then added. The temperature was raised to 95° C. The reaction was carried out for 6 hours, to obtain 545 g final resin.

Example A-3

300 g hexafunctional acrylate monomer (EM265 provided by Eternal Chemical Co., Ltd.) and 0.76 g (0.05 equivalent weight of acac) catalyst DBU (1,8-diazabicyclo[5.4.0]undec-7-ene, ACROS CHEMICALS) were weighed and mixed in a four-mouth flask with stirring at room temperature, and 13 g (0.25 equivalent weight) Michael donor (Acac, ACROS CHEMICALS) was then added. The temperature was raised to 95° C. The reaction was carried out for 6 hours, to obtain 313 g final resin.

Example A-4

2500 g hexafunctional acrylate monomer (EM265 provided by Eternal Chemical Co., Ltd.) and 8.21 g (0.05 equivalent weight of DBM) catalyst DBU (1,8-diazabicyclo[5.4.0]undec-7-ene, ACROS CHEMICALS) were weighed and mixed in a four-mouth flask with stirring at room temperature, and 242 g (0.25 equivalent weight) Michael donor (DBM, ACROS CHEMICALS) was then added. The temperature was raised to 95° C. The reaction was carried out for 6 hours, to obtain 2745 g final resin.

Examples A-5

500 g hexafunctional acrylate monomer (EM265 provided by Eternal Chemical Co., Ltd.) and 1.64 g (0.05 equivalent weight of DDD) catalyst (1,8-diazabicyclo[5.4.0]undec-7-ene, ACROS CHEMICALS) were weighed and mixed in a four-mouth flask with stirring at room temperature, and 31 g (0.25 equivalent weight) Michael donor (DDD, ACROS CHEMICALS) was then added. The temperature was raised to 95° C. The reaction was carried out for 6 hours, to obtain 530 g final resin.

Example B

Example B-1

1500 g hexafunctional acrylate monomer (EM265 provided by Eternal Chemical Co., Ltd.) and 9.9 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 169 g (0.5 equivalent weight) Michael donor (EAA, ACROS CHEMICALS) was added, and 600 g monofunctional acrylate monomer (EM210 provided by Eternal Chemical Co., Ltd.) was then added. The temperature was raised to 95° C. The reaction was carried out for 6 hours, to obtain 2270 g final resin (HSY-705).

Example B-2

150 g hexafunctional acrylate monomer (EM265 provided by Eternal Chemical Co., Ltd.) and 1.0 g (0.05 equivalent weight of acac) catalyst DBU (1,8-diazabicyclo[5.4.0]undec-7-ene, ACROS CHEMICALS) were weighed and mixed in a four-mouth flask with stirring at room temperature, 13 g (0.5 equivalent weight) Michael donor (acac, ACROS CHEMICALS) was added, and 60 g monofunctional acrylate monomer (EM210 provided by Eternal Chemical Co., Ltd.) was then added. The temperature was raised to 95° C. The reaction was carried out for 6 hours, to obtain 223 g final resin.

Example B-3

250 g hexafunctional acrylate monomer (EM265 provided by Eternal Chemical Co., Ltd.) and L64 g (0.05 equivalent weight of DBM) catalyst DBU (1,8-diazabicyclo[5.4.0]undec-7-ene, ACROS CHEMICALS) were weighed and mixed in a four-mouth flask with stirring at room temperature, 48.4 g (0.5 equivalent weight) Michael donor (DBM, ACROS CHEMICALS) was added, and 100 g monofunctional acrylate monomer (EM210 provided by Eternal Chemical Co., Ltd.), and then, the temperature was raised to 95° C. The reaction was carried out for 6 hours, to obtain 400 g final resin.

Example B-4

350 g hexafunctional acrylate monomer (EM265 provided by Eternal Chemical Co., Ltd.) and 2.3 g (0.05 equivalent weight of DDD) catalyst DBU (1,8-diazabicyclo[5.4.0]undec-7-ene, ACROS CHEMICALS) were weighed and mixed in a four-mouth flask with stirring at room temperature, 43.6 g (0.5 equivalent weight) Michael donor (DDD, ACROS CHEMICALS) was added, and 140 g monofunctional acrylate monomer (EM210 provided by Eternal Chemical Co., Ltd.) was then added. The temperature was raised to 95° C. The reaction was carried out for 6 hours, to obtain 535 g final resin.

Example B-5

300 g nanofunctional acrylate monomer (Preparation Example 1) and 0.3 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 7.0 g (0.25 equivalent weight) Michael donor (EAA, ACROS CHEMICALS) was added, and 82.4 g monofunctional acrylate monomer (EM210 provided by Eternal Chemical Co., Ltd.) was then added. The temperature was raised to 95° C. The reaction was carried out for 6 hours, to obtain 389 g final resin.

Example B-6

300 g pentadecafunctional acrylate monomer (EM6196 provided by Eternal Chemical Co., Ltd.) and 0.3 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 4.75 g (0.25 equivalent weight) Michael donor (EAA, ACROS CHEMICALS) was added, and then 56.1 g (EM210 provided by Eternal Chemical Co., Ltd.) monofunctional acrylate monomer was then added. The temperature was raised to 95° C. The reaction was carried out for 6 hours, to obtain 360 g final resin.

Example B-7

300 g nanofunctional acrylate monomer (Preparation Example 1) and 0.3 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 14.0 g (0.5 equivalent weight) Michael donor (EAA, ACROS CHEMICALS) was added, and 82.4 g monofunctional acrylate monomer (EM210 provided by Eternal Chemical Co., Ltd.) was then added. The temperature was raised to 95° C. The reaction was carried out for 6 hours, to obtain 396 g final resin.

Example B-8

300 g pentadecafunctional acrylate monomer (EM6196 provided by Eternal Chemical Co., Ltd.) and 0.3 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 9.5 g (0.50 equivalent weight) Michael donor (EAA, ACROS CHEMICALS) was added, and 56.1 g monofunctional acrylate monomer (EM210 of Eternal Chemical Co., Ltd.) was then added. The temperature was raised to 95° C. The reaction was carried out for 6 hours, to obtain 365 g final resin.

Example B-9

200 g hexafunctional acrylate monomer (EM265 provided by Eternal Chemical Co., Ltd.) and 1.32 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 22.5 g (0.5 equivalent weight) Michael donor (EAA, ACROS CHEMICALS) was added, and 86.4 g monofunctional acrylate monomer (EM70 provided by Eternal Chemical Co., Ltd.) was then added. The temperature was raised to 95° C. The reaction was carried out for 6 hours, to obtain 310 g final resin.

Example B-10

200 g hexafunctional acrylate monomer (EM265 provided by Eternal is Chemical Co., Ltd.) and 0.65 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 11.2 g (0.25 equivalent weight) Michael donor (EAA, ACROS CHEMICALS) was added, and 130 g bifunctional acrylate monomer (EM2202 provided by Eternal Chemical Co., Ltd.) was then added. The temperature was raised to 95° C. The reaction was carried out for 6 hours, to obtain 340 g final resin.

Example C-1

774 g melamine hexaacrylate monomer (LSC-M6 provided by Eternal Chemical Co., Ltd., CAS:33697-65-3) and 0.67 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, and 11.25 g (0.1 equivalent weight) Michael donor (EAA, ACROS CHEMICALS) was then added. The temperature was raised to 95° C. The reaction was carried out for 6 hours, to obtain 781 g final resin (HSY-703M).

Example C-2

774 g melamine hexaacrylate monomer (LSC-M6 provided by Eternal Chemical Co., Ltd., CAS:33697-65-3) and 1.32 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, and 22.5 g (0.2 equivalent weight) Michael donor (EAA, ACROS CHEMICALS) was then added. The temperature was raised to 95° C. The reaction was carried out for 6 hours, to obtain 795 g final resin.

Example D-1

2320 g melamine hexaacrylate monomer (LSC-M6 provided by
Eternal Chemical Co., Ltd., CAS:33697-65-3) and 9.9 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 169 g (0.5 equivalent weight) Michael donor (EAA, ACROS CHEMICALS) was added, and 600 g monofunctional acrylate monomer (EM210 provided by Eternal Chemical Co., Ltd.) was then added. The temperature was raised to 95° C. The reaction was carried out for 6 hours, to obtain 3090 g final resin.

Example D-2

309.3 g melamine hexaacrylate monomer (LSC-M6 provided by Eternal Chemical Co., Ltd., CAS:33697-65-3) and 1.32 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 22.5 g (0.5 equivalent weight) Michael donor (EAA, ACROS CHEMICALS) was added, and 86.4 g monofunctional acrylate monomer (EM70 provided by Eternal Chemical Co., Ltd.) was then added. The temperature was raised to 95° C. The reaction was carried out for 6 hours, to obtain 417 g final resin.

Example D-3

309.3 g melamine hexaacrylate monomer (LSC-M6 provided by Eternal Chemical Co., Ltd., CAS:33697-65-3) and 0.65 g (0.05 equivalent weight of EAA) catalyst DBU (1,8-diazabicyclo[5.4.0]undec-7-ene, ACROS CHEMICALS) were weighed and mixed in a four-mouth flask with stirring at room temperature, 11.2 g (0.25 equivalent weight) Michael donor (EAA, ACROS CHEMICALS) was added, and 130 g bifunctional acrylate monomer (EM2202 provided by Eternal Chemical Co., Ltd.) was then added. The temperature was raised to 95° C. The reaction was carried out for 6 hours, to obtain 450 g final resin.

Comparative Example A1

The steps were the same as those in Example B-1, except that the reaction was carried out without adding a monofunctional acrylate monomer. As a result, gelation of resin was observed.

Comparative Example A2

The steps were the same as those in Example B-5, except that the reaction was carried out without adding a monofunctional acrylate monomer. As a result, gelation of resin was observed.

Comparative Example A3

The steps were the same as those in Example B-6, except that the reaction was carried out without adding a monofunctional acrylate monomer. As a result, gelation of resin was observed.

Comparative Example C1

The steps were the same as those in Example D-1, except that the reaction was carried out without adding a monofunctional acrylate monomer. As a result, gelation of resin was observed.

Components of the resins of Examples A1-A5, B1-B10, C1-C2, D1-D3 and Comparative Examples A1-A3 and C1 of the present invention, the ratio of the components and the viscosity values of the resins were listed in Table 1.

It is shown by results of Examples A-1 and A-2 that, under the same reaction conditions, by adding different amounts of the Michael donor, the viscosity of the prepared resin can be modified, and the coating composition of the present invention can be obtained and has a viscosity in a range of 1600 to 2200 cps for Example A-1 and in a range of 12000 to 14000 cps for Example A-2.

Similarly, it is shown by results of Examples C-1 and C-2 that, under the same reaction conditions, by adding different amounts of the Michael donor, the viscosity of the prepared resin can be modified, and the coating composition of the present invention can be obtained and has a viscosity in a range of 6000 to 9000 cps for Example C-1 and in a range of 25000 to 30000 cps for Example C-2.

It is shown by results of Examples A-1, A-3, A-4 and A-5 that, the type of the Michael donor suitable for the present invention is not particular limited, and under the same reaction conditions, by adding different types of Michael donors (EAA, acac, DBM or DDD), the coating composition of the present invention can be obtained, and the viscosity values of Examples A-3, A-4 and A-5 are respectively 2300 to 2800 cps, 550 to 900 cps and 1200 to 1500 cps.

It is shown by results of Example B-1 and Comparative Example A1 that, when a large amount (0.5 equivalent weight) of Michael donor is added, a viscosity modifier (monofunctional acrylate monomer) may be appropriately added to the resin of the present invention to modify the viscosity of the resin, so as to avoid occurrence of gelation of the resin of Comparative Example A1, and the viscosity of the resin is in a range of 1100 to 1300 cps.

It is shown by results of Examples B-1, B-2, B-3 and B-4 that, the type of the Michael donor of the present invention is not particularly limited when the amount (0.5 equivalent weight) of the Michael donor is fixed and a viscosity modifier is added, and under the same reaction conditions, by adding different types of Michael donors, the resin of the present invention can be obtained without occurrence of gelation of the resin of Comparative Example A1, and the viscosities of the prepared resins of Examples B-1, B-2, B-3 and B-4 are respectively in a range of 1100 to 1300 cps, 400 to 700 cps, 75 to 120 cps and 200 to 400 cps.

In Examples B-5 and B-6, when a nonafunctional Michael donor and a pentadecafunctional Michael donor are respectively used, and a viscosity modifier is added, the viscosities of the prepared resins are respectively in a range of 6900 to 7300 cps and 1200 to 1600 cps.

TABLE 1

| Example | D/A (/m, m' or d) | Molar ratio of components | Viscosity value (cps) |
|---|---|---|---|
| A-1 | EAA/6 | 1/0.25 | 1600 to 2200 |
| A-2 | EAA/6 | 1/0.4 | 12000 to 14000 |
| A-3 | acac/6 | 1/0.25 | 2300 to 2800 |
| A-4 | DBM/6 | 1/0.25 | 550 to 900 |
| A-5 | DDD/6 | 1/0.25 | 1200 to 1500 |
| B-1 | EAA/6/m | 1/0.5/1.2 | 1100 to 1300 |
| B-2 | acac/6/m | 1/0.5/1.2 | 550 to 700 |
| B-3 | DBM/6/m | 1/0.5/1.2 | 75 to 120 |
| B-4 | DDD/6/m | 1/0.5/1.2 | 200 to 400 |
| B-5 | EAA/9/m | 1/0.25/2 | 6900 to 7300 |
| B-6 | EAA/15/m | 1/0.25/2 | 1300 to 1600 |
| B-7 | EAA/9/m | 1/0.5/2 | 9900 to 11300 |
| B-8 | EAA/15/m | 1/0.5/2 | 4300 to 5700 |
| B-9 | EAA/6/m' | 1/0.5/1.2 | 950 to 1200 |
| B-10 | EAA/6/d | 1/0.5/1.2 | 85 to 120 |
| C-1 | EAA/6 | 1/0.1 | 6000 to 9000 |
| C-2 | EAA/6 | 1/0.2 | 25000 to 30000 |
| D-1 | EAA/6/m | 1/0.5/1.2 | 1500 to 3500 |
| D-2 | EAA/6/m' | 1/0.5/1.2 | 2000 to 4000 |
| D-3 | EAA/6/d | 1/0.5/1.2 | 6000 to 10000 |
| Comparative Example A1 | EAA/6 | 1/0.5 | Gelation |
| Comparative Example A2 | EAA/9 | 1/0.25 | Gelation |
| Comparative Example A3 | EAA/15 | 1/0.25 | Gelation |
| Comparative Example C1 | EAA/6 | 1/0.5 | Gelation |

Note:
in D/A(/m, m' or d), D, A, m(m') and d respectively represent a type of a Michael donor, the number of acrylic functional groups of a Michael acceptor, monofunctional monomer and difunctional monomer;
the examples marked with m(m') and d represent that the component is added to the composition;
m, m' and d respectively represent EM210 ® (2-phenoxy ethyl acrylate), EM70 ® (isoborny acrylate) and EM2202 ® (hydroxypivalyl hydroxypivalate diacrylate) manufactured by Eternal Chemical Co., Ltd.

It is shown by results of Examples B-1, B-7 and B-8 that, when a viscosity modifier is added, the number of functional groups of the Michael acceptor of the present invention is not limited. Under the same reaction conditions, by adding Michael acceptors having different numbers of functional groups (respectively being acrylic monomers having 6, 9 and 15 functional groups), the resin of the present invention can be obtained without occurrence of gelation of the resin of Comparative Examples A1-A3, and the viscosities of the prepared resins of Examples B-7 and B-8 are in a range of 9900 to 11300 cps and 4200 to 5700 cps.

It is shown by results of Examples B-1, B-9 and B-10 that, the type of the viscosity modifier suitable for in the present invention is not particularly limited, and under the same reaction conditions, by adding different types of viscosity modifiers (monofunctional or difunctional monomer), the resin of the present invention can be obtained without occurrence of gelation of the resin of Comparative Example A1, and the viscosities of the prepared resins of Examples B-9 and B-10 are respectively in a range of 950 to 1200 cps and 85 to 120 cps.

Similarly, it is shown by results of Examples D-1, D-2 and D-3 that, the type of the viscosity modifier suitable for in the present invention is not particularly limited, and under the same reaction conditions, by adding different types of viscosity modifiers (monofunctional or difunctional monomer), the resin of the present invention can be obtained without occurrence of gelation of the resin of Comparative Example C1, and the viscosities of the prepared resins of Examples D-2 and D-3 are respectively in a range of 2000 to 4000 cps and 6000 to 10000 cps.

The amounts of the components of the coating composition containing the resin of the present invention, that is, Formulations A-F and K-L, are listed in Table 2, and the performance tests of the formulations are listed in Table 3. The formulations are merely formulated for performance tests, and if a functional coating needs to be formed in practical applications, other components need to be additionally added.

TABLE 3

| Test item | | A | B | C | D | E | F | K | L |
|---|---|---|---|---|---|---|---|---|---|
| Solvent Resistance (MEK) | 13 μm | >10³ | >10³ | >10³ | — | — | — | >10³ | — |
| | 20.6 μm | >10³ | >10³ | 122 | 15 | 465 | 480 | >10³ | 303 |
| Cross Hatch Adhesion (13 μm, ABS) | | 5B | 5B | 5B | 02B | 5B | 5B | 5B | 5B |
| Cross Hatch Adhesion (20.6 μm, ABS) | | 5B | 5B | 5B | B | 5B | 5B | 5B | 5B |
| Curing condition: (mJ/cm²) | | 1600 | 800 | 800 | 800 | 800 | 800 | 800 | 800 |
| Surface observation& | | S | S | C | C | S | S | S | S |
| Gloss level | | — | 94.7 | 75.1 | 50.5 | 92.7 | 91.7 | 95.9 | 96.5 |

Note:
The symbols "S" and "C" represent smooth and corrugated, respectively.

TABLE 2

| Component | A | B | C | D | E | F | K | L |
|---|---|---|---|---|---|---|---|---|
| HSY-703 | 60 | 60 | 0 | 0 | 57 | 0 | 0 | 0 |
| HSY-705 | 0 | 0 | 0 | 0 | 0 | 57 | 0 | 0 |
| HSY-703M | 0 | 0 | 0 | 0 | 0 | 0 | 60 | 57 |
| EM223 | 40 | 37 | 37 | 80 | 23 | 23 | 37 | 23 |
| EM265 | 0 | 0 | 60 | 0 | 0 | 0 | 0 | 0 |
| Carbon black | 0 | 0 | 0 | 6 | 6 | 6 | 0 | 6 |
| Dispersing agent (Tego 670) | 0 | 0 | 0 | 10 | 10 | 10 | 0 | 10 |
| Photo initiator (PI 184) | 0 | 3 | 3 | 0 | 0 | 0 | 3 | 0 |
| Photo initiator (PI 907) | 0 | 0 | 0 | 4 | 4 | 4 | 0 | 4 |
| In total | 100 | 100 | 100 | 100 | 100 | 100 | 100 | 100 |

Note:
HSY-703 is prepared from Example A-1, HSY-705 is prepared from Example B-1, HSY-703M is prepared from Example C-1, EM223 is a difunctional dilution monomer, EM265 is a hexafunctional dilution monomer.

It is shown by results of Formulation A of the coating composition of the present invention that, under conditions of no photo initiator added and under high-energy UV light (1600 mJ/cm²), the HSY-703 in Formulation A has the capability of curing.

In Formulations B and C with a photo initiator added, it is found through comparison that the MEK resistance and adhesion of Formulation B with HSY-703 resin added are similar to those of Formulation C with EM265 added, while Formulation B has a good result in the gloss level test. It is found during curing that partial corrugation occurs in a coating of Formulation C, while no corrugation occurs in a coating of Formulation B. Similarly, the test results of Formulation K with HSY-703M resin added are similar to or better than those of Formulation C with EM265 added.

By using Formulations D, E, F and L containing carbon black, a coating having a thickness of 20.6 μm is respectively prepared, and it is found through tests that the coating prepared by using Formulation D (merely containing a dilution monomer) cannot form a cured coating layer under the curing condition, while the coating prepared by using Formulations E, F and L can form a cured layer under the curing condition. That is to say, deep color coatings of Formulations E, F and L have excellent curing efficacy. In addition, it is found through tests that the coatings prepared by using Formulations E, F and L have good MEK resistance and adhesion (on an ABS substrate), and have a good color rendering effect. In addition, the gloss level of the coatings prepared by using Formulations E, F and L are greater than 90 gloss units, which is better than that of the coating prepared by using Formulation D.

The amounts of components and adhesion tests of Formulations G-J, M and N containing a red dye or pigment are listed in Table 4, and by using Formulations G-J, M and N containing a red dye or pigment, a coating having a thickness of 13 μm is respectively prepared. It is found through tests that the coatings prepared by using the formulations have good adhesion, and has an adhesion of 5 B on an ABS substrate.

TABLE 4

| Component | Formulation | | | | | |
|---|---|---|---|---|---|---|
| | G | H | I | J | M | N |
| HSY-703 | 20 | 0 | 20 | 0 | 0 | 0 |
| HSY-705 | 0 | 20 | 0 | 20 | 0 | 0 |
| HSY-703M | 0 | 0 | 0 | 0 | 20 | 20 |
| 6175-3 | 65 | 65 | 65 | 65 | 65 | 65 |
| EM219 | 9.7 | 9.7 | 9.7 | 9.7 | 9.7 | 9.7 |
| Red pigment | 2 | 2 | 0 | 0 | 2 | 0 |
| Red dye | 0 | 0 | 2 | 2 | 0 | 2 |
| Dispersing agent (BYK3570) | 0.3 | 0.3 | 0.3 | 0.3 | 0.3 | 0.3 |
| Photo initiator (Ccba C78) | 3 | 3 | 3 | 3 | 3 | 3 |
| In total | 100 | 100 | 100 | 100 | 100 | 100 |
| Cross Hatch Adhesion (13 μm, ABS) | 5B | 5B | 5B | 5B | 5B | 5B |

Note:
6175-3 is modified polyurethane acrylate, EM219 is a monofunctional acrylic monomer, the red pigment is purchased from First Well Chemical Limited (708-1097), and the red dye is purchased from SICchem, Taiwan.

The above-described examples of the present invention are intended to be illustrative only. Numerous alternative embodiments may be devised by persons skilled in the art without departing from the scope of the following claims.

What is claimed is:

1. A self-sensitive polymerizable liquid resin, comprising an uncrosslinked Michael addition reaction product of the following components:
    (a) a Michael donor;
    (b) a Michael acceptor; and
    (c) a viscosity modifier;
    wherein the Michael acceptor (b) has 5 to 18 acryloyl functional groups; and the molar ratio of (a) to (b) is in a range of 1:2 to 1:100, wherein the Michael donor is a β-dicarbonyl compound, wherein the viscosity modifier forms a covalent bond with the Michael donor at a terminal of the resin.

2. The self-sensitive polymerizable liquid resin according to claim 1, having a viscosity of 50 to 30000 cps at 60° C.

3. The self-sensitive polymerizable liquid resin according to claim 1, wherein the Michael acceptor is an acrylate compound having 5 to 18 acryloyl functional groups.

4. The self-sensitive polymerizable liquid resin according to claim 1, wherein the content of the Michael donor is approximately 1 wt % to 40 wt %, based on the total weight of the self-sensitive polymerizable liquid resin.

5. The self-sensitive polymerizable liquid resin according to claim 1, wherein the content of the Michael acceptor is approximately 50 wt % to 99 wt %, based on the total weight of the self-sensitive polymerizable liquid resin.

6. The self-sensitive polymerizable liquid resin according to claim 1, wherein the content of the viscosity modifier is sufficient to avoid gelation caused by over-crosslinking during a Michael addition reaction involving the Michael acceptor and the Michael donor and up to approximately 40 wt %, based on the total weight of the self-sensitive polymerizable liquid resin.

7. The self-sensitive polymerizable liquid resin according to claim 6, wherein the viscosity modifier comprises a monofunctional or bifunctional acrylic monomer, a monofunctional or bifunctional acrylate monomer or a mixture thereof.

8. The self-sensitive polymerizable liquid resin according to claim 1, wherein the β-dicarbonyl compound is selected from the group consisting of ethyl acetoacetate, methyl acetoacetate, 2-ethylhexylacetoacetate, laurylacetoacetate, tert-butyl acetoacetate, allylacetoacetate, benzylacetoacetate, isobutylacetoacetate, 2-methoxyethyl acetoacetate, 1,4-butanediol diacetoacetate, 1,6-hexane diol diacetoacetate, neopentyl glycol diacetoacetate, cyclohexanedimethanol diacetoacetate, ethoxylated bisphenol A diacetoacetate, trimethylolpropane triacetoacetate, polycaprolactone triacetoacetate, pentaerythritol tetraacetoacetate, acetoacetanilide, N-alkyl acetoacetanilide, acetoacetamide, 2-acetoacetoxyethyl acrylate, 2-acetoacetoxyethyl methacrylate, pentane-2,4-dione, hexane-2,4-dione, heptane-3,5-dione, dibenzoylmethane, diethyl methylmalonate, diethyl isopropylmalonate, cycloisopropyl (isopropylidenyl) malonate, 5,5-dimethylcyclohexane-1,3-dione, cyclopentane-1,3-dione, cyclohexane-1,3-dione, cycloheptane-1,3-dione, cyclooctane-1,3-dione, 2-acetylcyclopentatone, 2-acetylcyclohexanone, 2-acetylcycloheptanone, 2-acetylcyclooctanone and a mixture thereof.

9. The self-sensitive polymerizable liquid resin according to claim 1, having a viscosity of 50 to 15000 cps at 60° C.

10. The self-sensitive polymerizable liquid resin according to claim 1, wherein the content of the viscosity modifier is approximately 1 to 30 wt %, based on the total weight of the self-sensitive polymerizable liquid resin.

11. A coating composition, comprising the self-sensitive polymerizable liquid resin according to claim 1.

12. The coating composition according to claim 7, further comprising a carrier resin, a dilution monomer and, optionally, a coloring material.

13. The coating composition according to claim 11, comprising the coloring material.

14. The coating composition according to claim 12, wherein the coating composition does not contain a solvent.

15. The coating composition according to claim 12, wherein the coating composition does not contain a photo initiator.

16. The coating composition according to claim 12, wherein the coating composition contains a photo initiator.

17. A film, comprising:
    a subsrate; and a coating formed by the coating composition according to claim 11 on at least one surface of the substrate.

* * * * *